(12) United States Patent
Holloway et al.

(10) Patent No.: US 7,135,161 B2
(45) Date of Patent: Nov. 14, 2006

(54) METHOD OF PRODUCING NANOSIZED OXIDE POWDERS

(75) Inventors: Paul H. Holloway, Gainesville, FL (US); Mostafa Abboudi, Tangier (MA)

(73) Assignee: University of Florida Research Foundation, Inc., Gainesville, FL (US)

( * ) Notice: Subject to any disclaimer, the term of this patent is extended or adjusted under 35 U.S.C. 154(b) by 443 days.

(21) Appl. No.: 10/656,717

(22) Filed: Sep. 4, 2003

(65) Prior Publication Data

US 2005/0053538 A1   Mar. 10, 2005

(51) Int. Cl.
*C01G 1/00* (2006.01)

(52) U.S. Cl. ............... 423/592.1; 423/263; 423/593.1; 423/594.14; 423/604; 423/622; 423/633; 977/775; 977/777; 977/811

(58) Field of Classification Search ............... 423/263, 423/592.1, 593.1, 594.14, 604, 622, 633; 977/775, 777, 811
See application file for complete search history.

(56) References Cited

U.S. PATENT DOCUMENTS 5,219,829 A * 6/1993 Bauer et al. ............... 505/510
2005/0029495 A1 * 2/2005 Hubacek et al. ...... 252/301.4 R
2005/0095194 A1 * 5/2005 Park et al. ................. 423/622

FOREIGN PATENT DOCUMENTS

| CN | 1401578 | 3/2003 |
|---|---|---|
| CN | 1403375 | 3/2003 |
| WO | WO 03/048047 A1 | 6/2003 |
| WO | WO 03/089374 A1 | 10/2003 |

OTHER PUBLICATIONS

Wang et al., "Synthesis of zinc oxide nanoparticles with controlled morphology," J. Mater Chem., 9:2871-2878, 1999.
Look, "Recent advances in ZnO materials and devices," Materials Science and Engineering, B80:383-387, 2001.
Lakshmi et al., "Sol-Gel Template Synthesis of Semiconductor Nanostructures," Electrochemical Society Proceedings, 97-11:47-55, 1997.

* cited by examiner

*Primary Examiner*—Timothy Vanoy
(74) *Attorney, Agent, or Firm*—Akerman Senterfitt; Neil R. Jetter (57) ABSTRACT

A method of forming metal oxide powders includes the steps of solid state mixing of at least one metal nitrate salt, such as $Fe(NO_3)_3$ or a combination of metal nitrate salts such as $Zn(NO_3)_3 \cdot 6H_2O$ and $Ga(NO_3)_3 \cdot xH_2O$, and at least one reducing organic acid, such as tartaric or citric acid. The mixture is heated to form a metal oxide powder, such as alpha-iron oxide ($\alpha\text{-}Fe_2O_3$) or a mixed metal powder such as zinc gallate phosphor ($ZnGa_2O_4$). A metal oxide precursor intermediate can be formed and then heated to form the metal oxide powder.

10 Claims, 10 Drawing Sheets

METHOD OF PRODUCING NANOSIZED OXIDE POWDERS

BACKGROUND

The synthesis of oxide materials is most commonly performed using a solid-state reaction between two or more metal oxide species. This process is generally referred to as the "ceramic method". High temperatures typically being greater than 800° C. are required to ensure the diffusion of metals in the mixture and obtain the desired compounds having homogeneous morphology and composition. During this process intermediate grinding and heating is sometimes necessary.

Synthesis methods using soft chemistry at lower temperatures are known to produce oxide materials at a lower cost. These methods include sol-gel, co-precipitation of precursors, combustion reaction, and hydrothermal or solvothermal synthesis. A more attractive method for industrial production of metal oxide powders is the co-precipitation of precursors molecules (e.g. oxalates, citrates or tartrates) and subsequent thermal reactions. But this method suffers from variability in product due to variation of factors such as temperature, concentration, pH, and the rate of addition of the respective solutions.

SUMMARY

A method of forming metal oxide powders includes the steps of solid state mixing of at least one metal nitrate salt and at least one reducing organic acid. The mixture is then heated to form a metal oxide powder. At least a portion of the heating is generally performed in an oxygen containing atmosphere. The organic acid can be a hydroxy acid, such as tartaric acid or citric acid. The average particle size of the metal oxide powder formed can be from 10 to 100 nm. The metal nitrate salt can comprise at least two different metal nitrate salts.

The heating step can comprise a first heating step which forms a metal oxide precursor complex from the metal nitrate salt and the reducing organic acid, and a second heating step which converts the precursor complex into the metal oxide powder. The first heating step can be performed at a temperature from 200 to 400° C., while the second heating step can be performed at a temperature from 200 to 1600° C. The method can include the step of grinding the precursor before the second heating step.

The metal oxide powder formed can include a phosphor. The metal oxide powder can also be an ion conductive metal oxide, such as a cerium oxide.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

A method of forming metal oxide powders includes the step of solid state mixing of at least one metal nitrate salt and at least one reducing organic acid in the desired proportions. The nitrate salt(s) generally has the general formula $M_x(NO_3)_y$ where M is a metal.

The mixture is then heated to a temperature from about 200° C. to 1200° C. to form a metal oxide powder. The reducing acid provides electrons for the reduction of the nitrate ion $NO_3^-$, such as to $NO_2$ through a NO intermediate. The reducing organic acid is preferably a hydroxy acid, defined as any acid that has hydroxyl groups in addition to the hydroxyl group provided by the acid itself. Examples of hydroxy acids include 2-hydroxybenzoic acid, hydroxybenzoic acid, juniperic acid, salicylic acid, tartaric acid and citric acid. These acids are generally solids at room temperature. For example, tartaric acid is a white crystalline solid which has a melting point of about 172 to 174° C.

Although the method can be performed in a single heating step performed at a single temperature, the production of oxide nanopowders according to the invention is generally described as being performed in two steps. The two steps are generally performed at different temperatures.

A few drops of water are typically added to start the reaction. The initiating water concentration is typically less than 1 vol % of the total volume including the metal salt and the organic acid. As can be seen from the equations below, the overall reaction generates all the water it consumes. However, certain metal nitrates, such as rare earth nitrates, may be hygroscopic and thus do not require any water to be actively added to initiate the reaction.

The solid state mixture is then heated, such as on a hot plate or furnace, to a temperature of about 200° C. to 400° C. Alternatively, other heat sources such as microwave inductive, hot gas or laser can be used. For example, if the organic acid is tartaric acid a solid precursor tartrate is obtained.

Tartaric acid is the organic acid used in the exemplary synthesis shown below. In this first step, nitrate anions $NO_3^-$ from the metal salt are believed to be first reduced (EQ #2) by reaction products generated by the reaction tartaric acid ($C_4H_6O_6$) with water (EQ #1):

$$C_4H_6O_6 + 2H_2O \rightarrow 2CO_2 + 2HCOOH + 6H^+ + 6e^- \quad \text{EQ \#1}$$

$$NO_3^- + 4H^+ + 3e^- \rightarrow NO + 2H_2O \quad \text{EQ\#2}$$

then $NO + \frac{1}{2}O_2 \rightarrow NO_2$

The reduction potential for EQ #2 is 0.957 volts at standard conditions (CRC Handbook of Chemistry and Physics—78 th Ed. 1997–1998 page 8–23). Accordingly, for the reaction sequence of EQ #1 and EQ #2 to proceed spontaneously, the potential for EQ #1 must be >−0.957 volts. Therefore, as defined herein, the term "reducing acid" refers to an acid that provides a potential of >−0.957 volts at standard conditions for the electron generating reaction by the acid, such as EQ #1, thus providing the electrons for the spontaneous reduction of the nitrate anion and the resulting formation of the metal oxide powder.

The above synthesis is typical but not an exclusive sequence of chemical reactions which can be used to form the metal oxide powder. For example, intermediate $N_2O_4$ and other molecular species are possible routes. As shown above, the acid (e.g. tartaric acid) reduces the nitrate anion. The cation metal species provided by the salt then complexes with one or more electron donating ligands, such as the carboxylate group of tartaric acid from the tartaric acid to form a metal tartrate ($M_x(C_4H_4O_6)_y$, $ZH_2O$, where Z=1, 2, 3 . . . ). The metal tartrate is generally a polycrystalline solid. Similar reactions are expected with citric acid ($C_6H_8O_7$) and other hydroxy acids. Using citric acid, for example, a metal citrate complex is formed.

Generation of $NO_2$ with its characteristic color is observed. A color change to red is a positive test for the reduction of the nitrate ion and indicates that nitrate ($NO^{-3}$) has been reduced to nitrogen dioxide ($NO_2$). If desired, the precursor can be ground to produce a more homogenous powder, especially for poly-metallic oxides such as zinc gallate doped with europium or manganese. Another example is ionic conducting cerium lanthanum oxide ($Ce_{2-x}La_xO_{2-x/2}$) or cerium gadolinium oxide ($Ce_{2-x}Gd_xO_{2-x/2}$).

In the second step, the precursor powder is heated in an oxygen containing environment, such as a furnace or other heating source open to the atmosphere, to form the metal oxide product. The temperature utilized is selected based on the desired metal oxide species. Typically, a temperature of 800 to 1000° C. is used, although a temperature as low as 200° C. may be used. In addition, a temperature as high as about 1600° C. may be used to prepare a densified ceramic.

As noted above, in some cases such as the monometallic oxides ZnO and CuO, the formation of the metal oxide powder can be performed in a single step. For example, a single 350° C. heat step for CuO of and a single heat step at 550° C. for ZnO can be used.

The process is applicable for the production of metal oxide materials in fine powder form having grain sizes in the nanometer scale, such as 10 to 200 nm. In most cases, the invention can be used to produce finer metal oxide powders than available using other methods. The only requirement is that the metal species desired exists as a nitrate salt for use as a starting material. Since most metal species exist as a nitrate salt, the process can be used to produce virtually any composition of thermodynamically simple or compound metallic oxides.

The invention is a significant improvement over the prior art in the ease of a simple process to produce homogenous powder oxides. In the described process, the heating temperature is the only critical process factor to control. The method thus avoids the sol gel method or the use of solutions, thus avoiding having to control factors such as pH, concentration, and speed of addition of the solutions. The yield of metal oxide product is near 100%. The invention thus represents a process for forming metal oxides that is both very simple and highly economical, with a total time to prepare an oxide being only two to three hours.

The invention can be used for a wide variety of applications. For example, chemical suppliers and a wide variety of technologies use metal oxide materials, especially as very fine powders.

For example, applications for the invention exist in phosphor technology, electronic materials, catalysts, fuel cells and sensors. In the case of phosphors, the invention can be used to produce low cost stable oxide phosphors with high luminous efficiency. In the case of fuel cells, the invention can be used to form metal oxide electrolytes with high ionic conductivity at lower temperatures for use in solid oxide fuel cells (SOFCs) in oxygen gas separation or in sensor devices. Ceramic electrode oxides can be produced using this invention, such as $Sm_{0.6}Sr_{0.4}CoO_3$, to be used as a cathode in SOFCs, or oxides such as $[(SmO_{1.5})_{0.2}(CeO_2)_{0.8}]$ which is used to produce Ni-oxide composite anodes for SOFCs. For electronic application, transparent conductive oxide such as ZnO can be prepared.

EXAMPLES

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof.

Example 1

Synthesis of $La_2O_3$: $Tb^{3+}$ (1% Phosphor)

| Mixture 1: | $La(NO_3)_3$, $6H_2O$ | 99.99% | 12.8607 gram |
|---|---|---|---|
| | $Tb(NO_3)_3$, $6H_2O$ | 99.99% | 0.1359 gram |
| | Tartaric acid | | 15.11 gram |

Figure 1A:
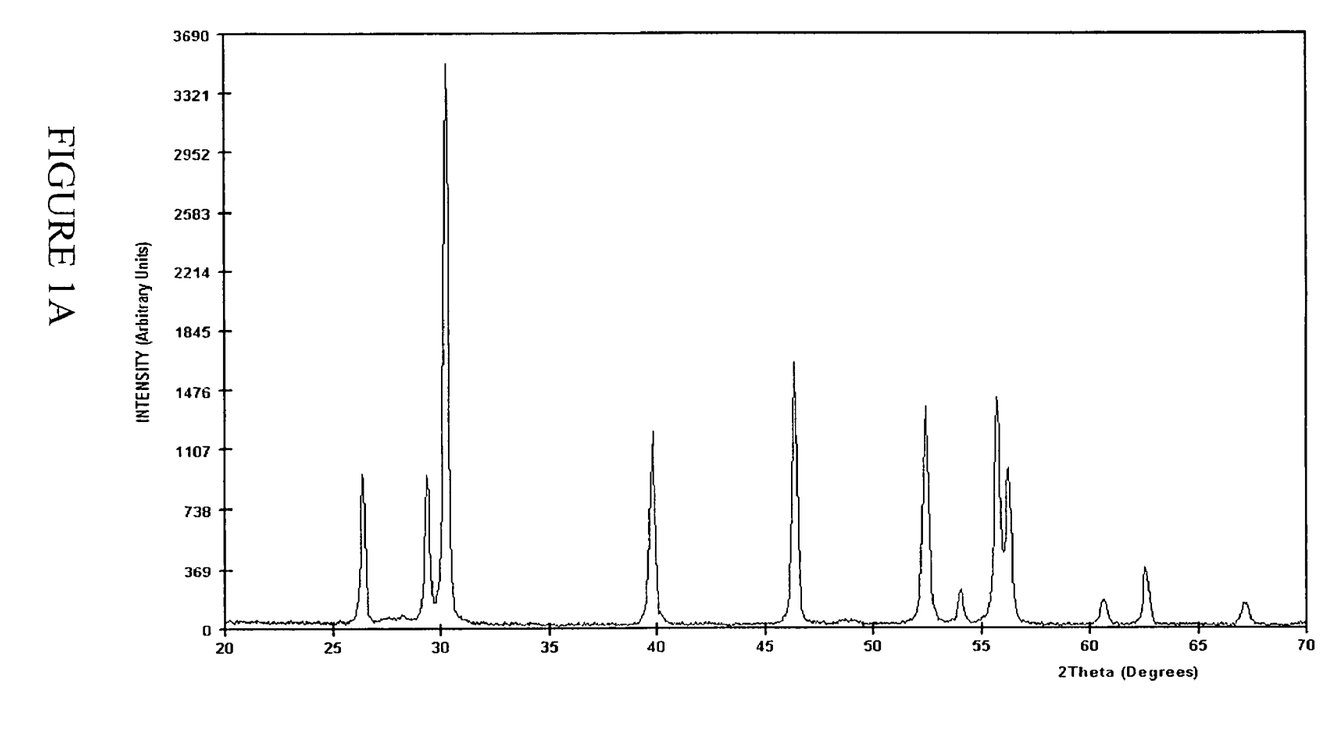
FIG. 1(a) is an XRD (X-Ray Diffraction) pattern of $La_2O_3$ powder formed using the invention.
Figure 1B:
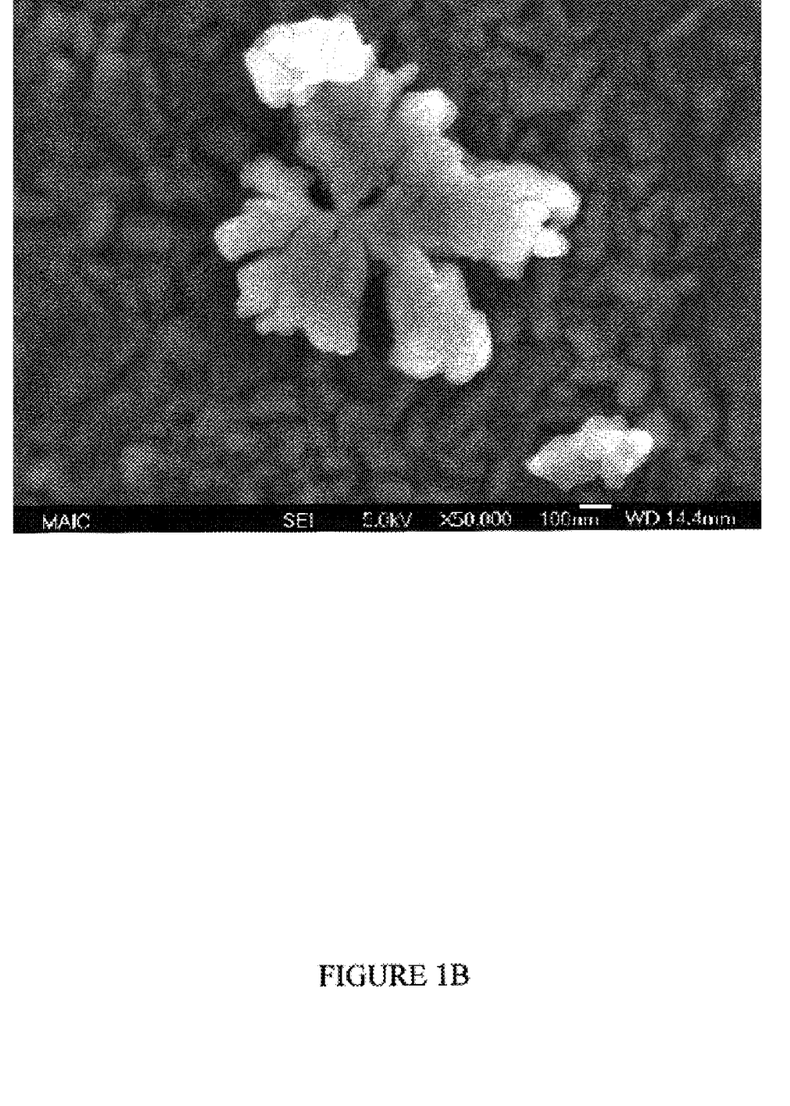
FIG. 1(b) is a SEM image of the powder shown in FIG. 1(a) indicating the average particle size to be about 100 nm.

The mixture was heated at a temperature between 200° C. and 300° C. on a hot plate to reduce first the nitrate anions to permit formation of the metal precursor complex. The precursor was heated at 900° C. for two hours in air leading to the formation of the doped lanthanum oxide $La_2O_3$:$Tb^{3+}$ (1%). FIG. 1(a) is an XRD (X-Ray Diffraction) pattern of this phase. It is identified using J.C.P.D.S. card # 05062 as $La_2O_3$. An SEM image of this powder shown in FIG. 1(b) indicates that the average particle size to be about 100 nm.

Example 2

Synthesis of Zinc Gallate Phosphor ($ZnGa_2O_4$)

| Mixture 2: | $Zn(NO_3)_3$, $6H_2O$ | 99.99% | 1.4873 gram |
|---|---|---|---|
| | $Ga(NO_3)_3$, $xH_2O$ | 99.99% | 2.5573 gram |
| | Tartaric acid | | 4.51 gram |

Figure 2A:
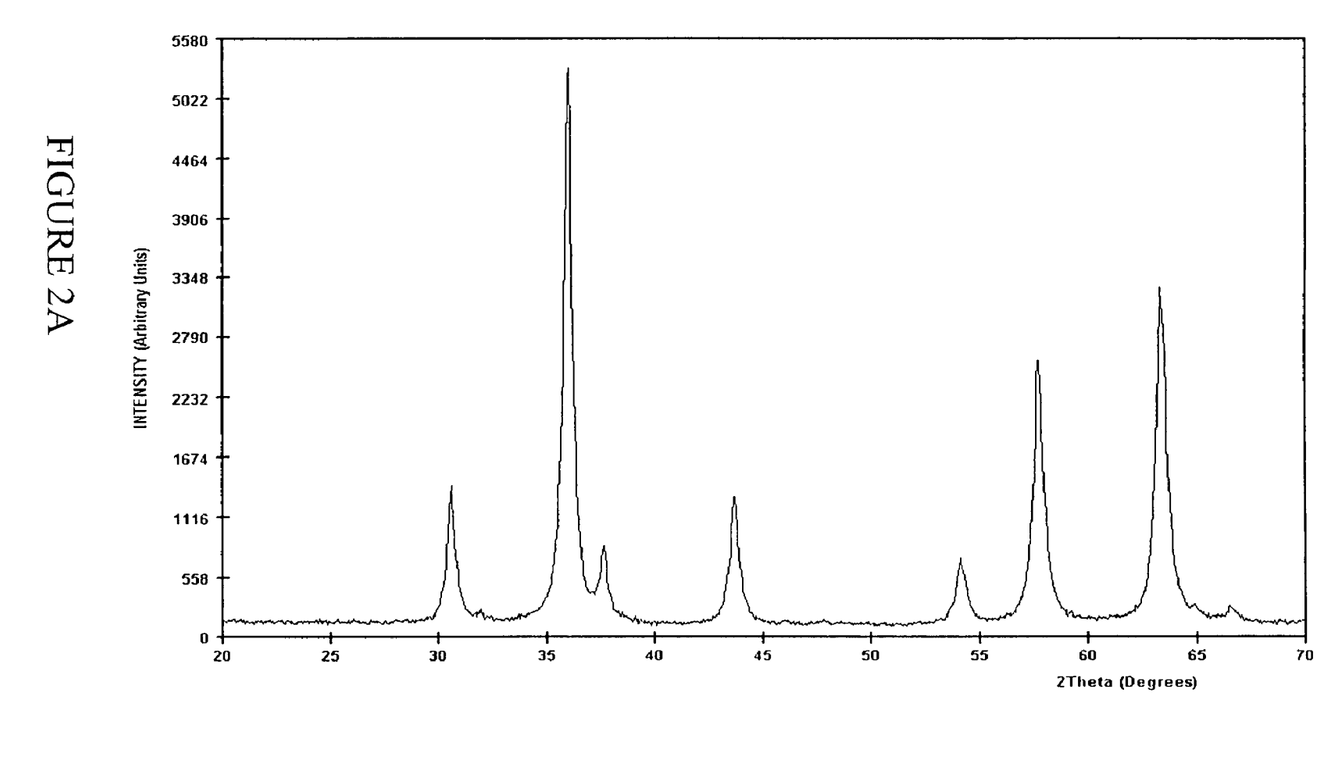
FIG. 2(a) is an XRD pattern of zinc gallate powder formed using the invention.
Figure 2B:
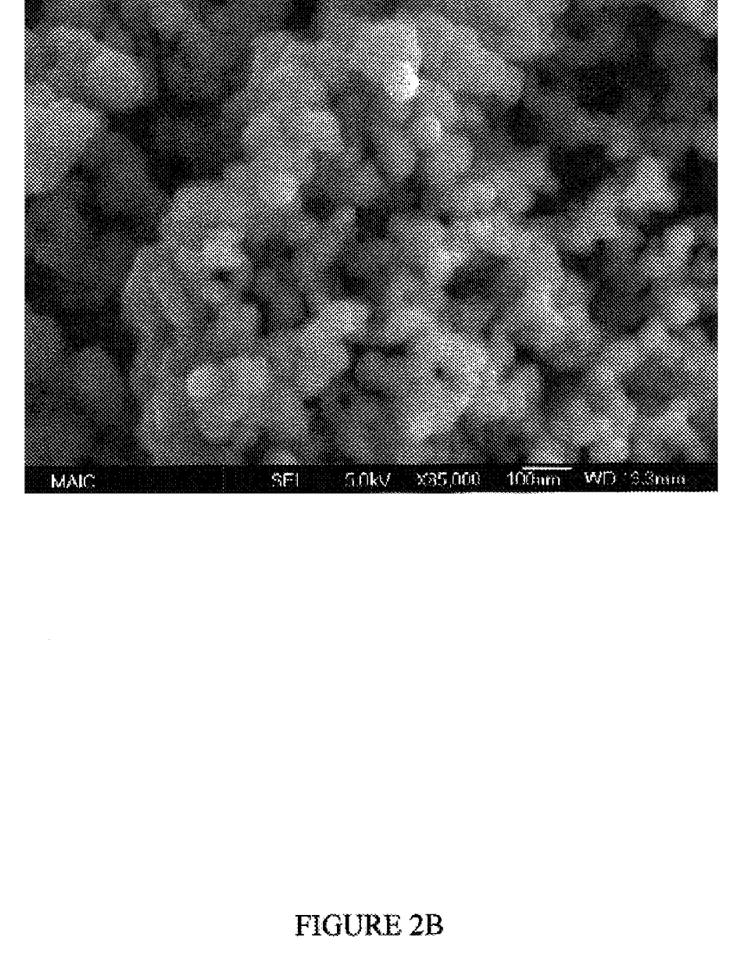
FIG. 2(b) is a SEM image of the powder shown in FIG. 2(a) indicating the average particle size to be about 70 nm.

Mixture 2 was heated, first on a hot plate at 200° C. to 300° C. to reduce the nitrate anions and form the metal precursor complex. The precursor was then heated in a furnace at 750° C. for two hours in air. The XRD pattern shown in FIG. 2(a) is that of the zinc gallate. It is identified with J.C.P.D.S. card # 38-1240. A SEM photograph of this powder shown in FIG. 2(b) indicates that the average particle size is about 70 nm.

Example 3

Synthesis of Pigment Alpha-iron Oxide ($\alpha$-Fe2O3: Hematite)

| Mixture 3: | Fe(NO$_3$)$_3$, 9H$_2$O | 99.99% | 4.04 gram |
|---|---|---|---|
| | Tartaric acid | | 5.11 gram |

Figure 3A:
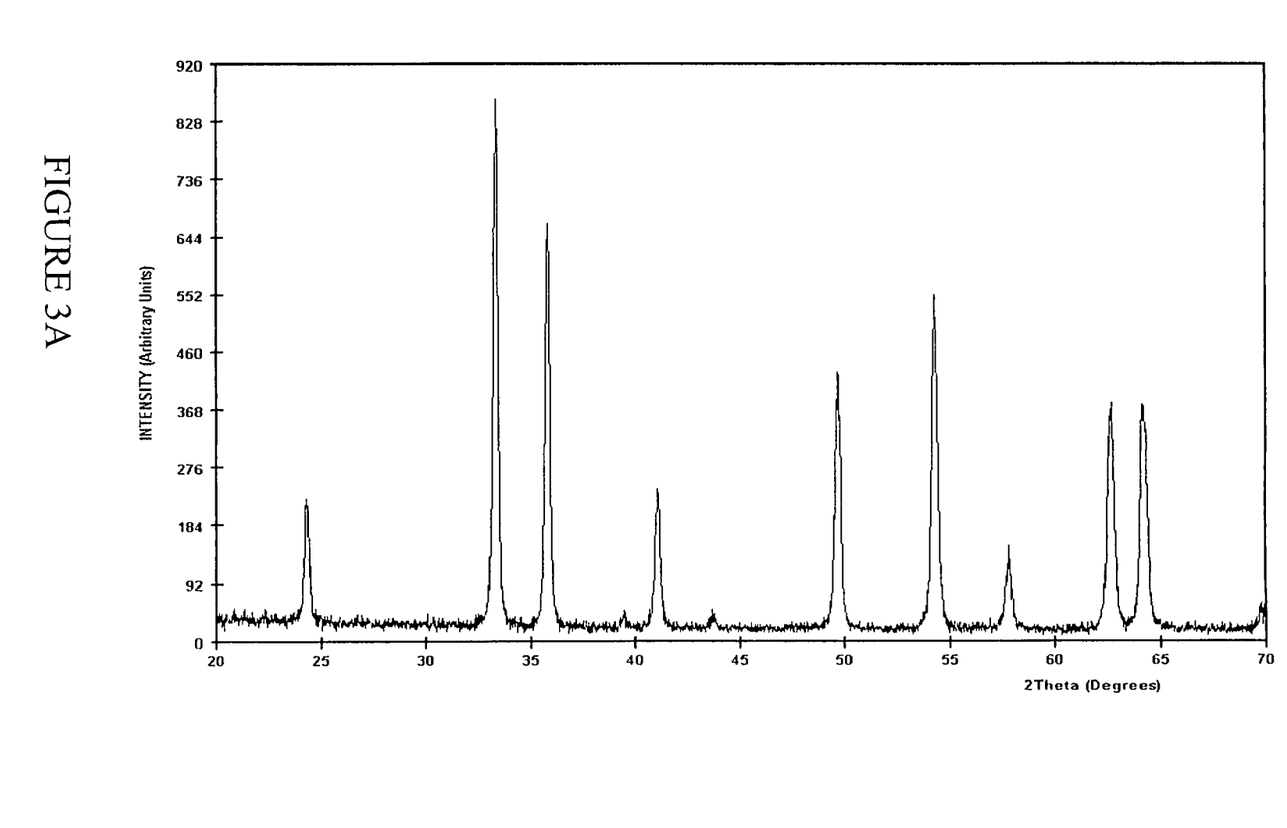
FIG. 3(a) is an XRD pattern of $\alpha$-$Fe_2O_3$ powder formed using the invention
Figure 3B:
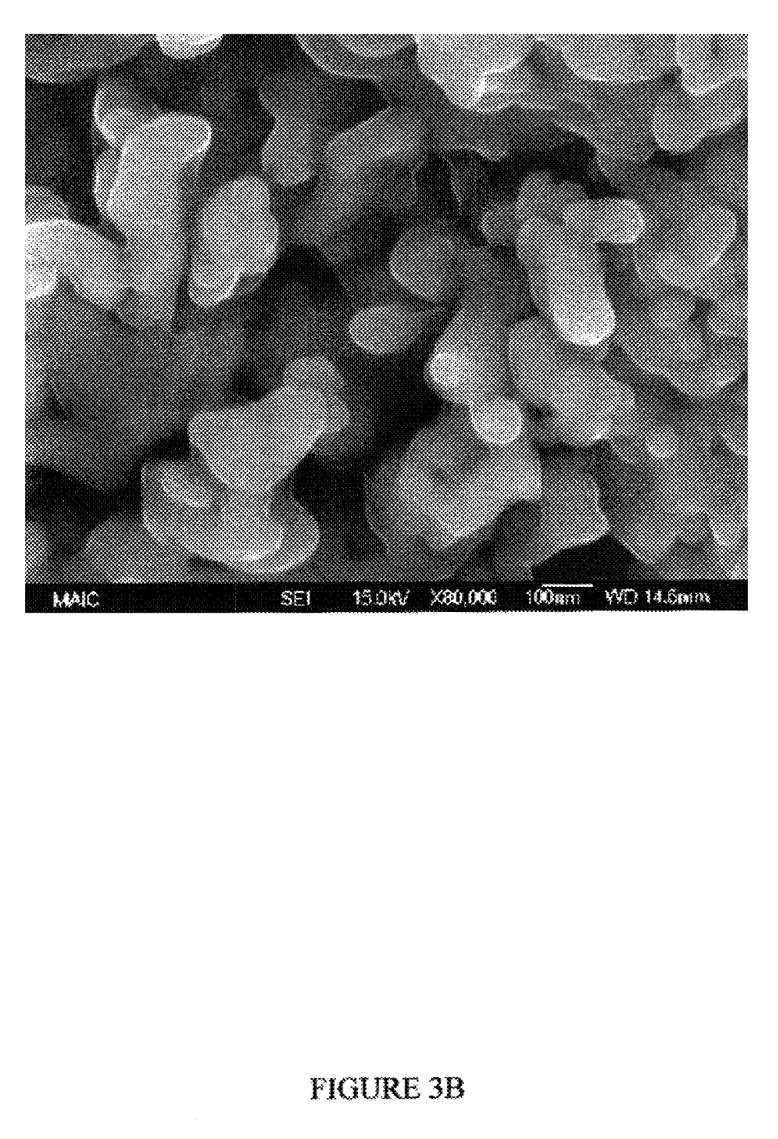
FIG. 3(b) is a SEM image of the powder shown in FIG. 3(a) indicating the average particle size to be about 150 nm.

The mixture was first heated on a hot plate at a temperature between 200° C. and 300° C. Once the reduction of the nitrate ions was completed, the resulting metal precursor complex was heated in air at 550° C. for two hours. Dark red pigment $\alpha$-Fe$_2$O$_3$ was formed as confirmed by the XRD pattern shown in FIG. 3(a). $\alpha$-Fe$_2$O$_3$ was identified using J.C.P.D.S. card # 33-0664. A SEM photograph of this powder shown in FIG. 3(b) indicates the average particle size to be about 150 nm.

Example 4

Synthesis of Ionic Conducting Ce$_{0.8}$La$_{0.2}$O$_{1.9}$

| Mixture 4: | Ce(NO$_3$)$_3$, 6H$_2$O | 99.99% | 3.4738 gram |
|---|---|---|---|
| | La(NO$_3$)$_3$, 6H$_2$O | 99.99% | 0.8660 gram |
| | Tartaric acid | | 5.11 gram |

Figure 4A:
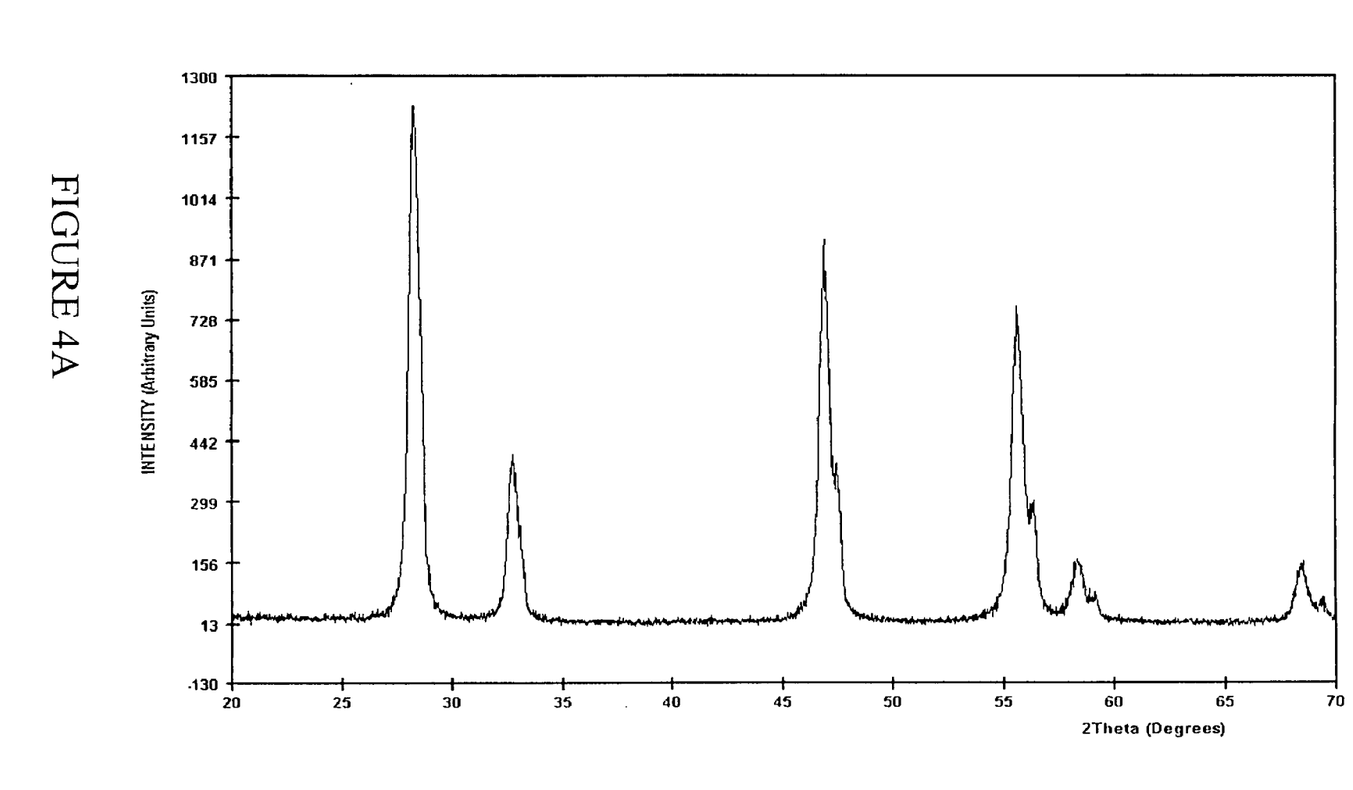
FIG. 4(a) is an XRD pattern of $Ce_8La_2O_{19}$ powder formed using the invention
Figure 4B:
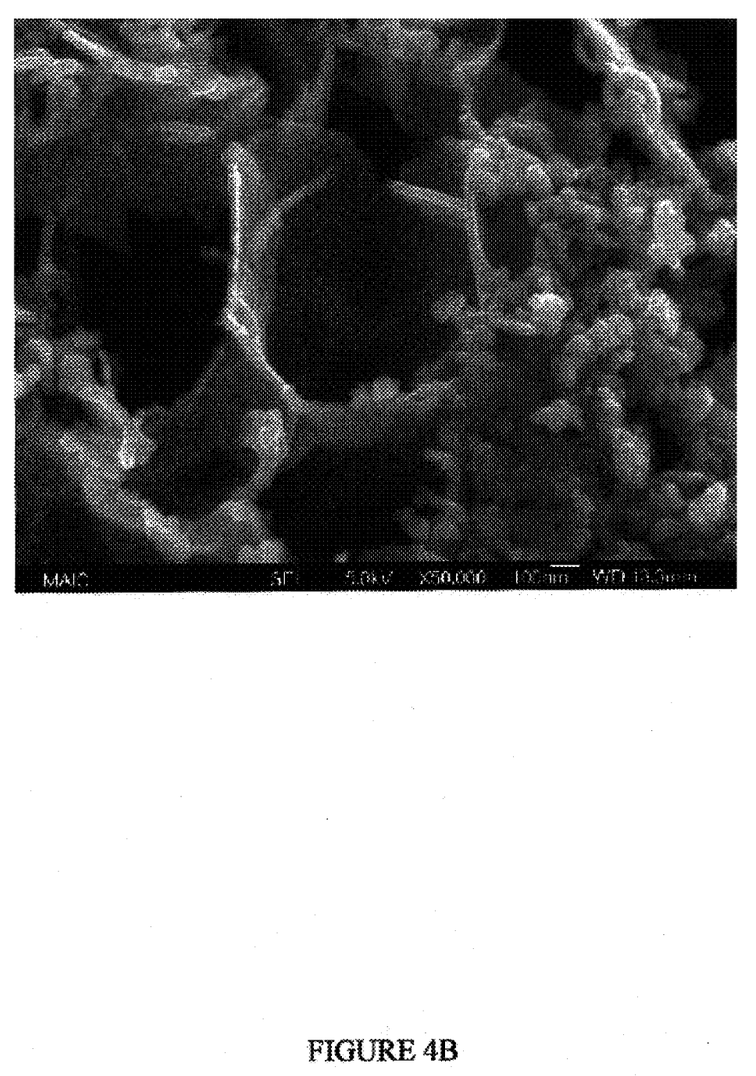
FIG. 4(b) is a SEM image of the powder shown in FIG. 4(a) indicating the average particle size to be about 50 nm.

This mixture was first heated to between 200° C. and 300° C. The resulting metal precursor complex was heated in air at 800° C. for two hours. The metal oxide material formed evidenced an XRD pattern shown in FIG. 4(a) equivalent to that of the compound Ce$_8$La$_2$O$_{19}$ as reported by S. Dikmen, P. Schuk and M. Greenblatt, Solid State Ionics, vol 126 (1999) 89–95. A SEM photograph of this powder shown in FIG. 4(b) indicates the average particle size to be about 50 nm.

Example 5

Synthesis of the Ionic Conducting Ce$_{0.9}$Gd$_{0.1}$O$_{1.95}$

| Mixture 5: | Ce(NO$_3$)$_3$, 6H$_2$O | 99.99% | 3.8981 gram |
|---|---|---|---|
| | Gd(NO$_3$)$_3$, 6H$_2$O | 99.99% | 0.4514 gram |
| | Tartaric acid | | 5.11 gram |

Figure 5A:
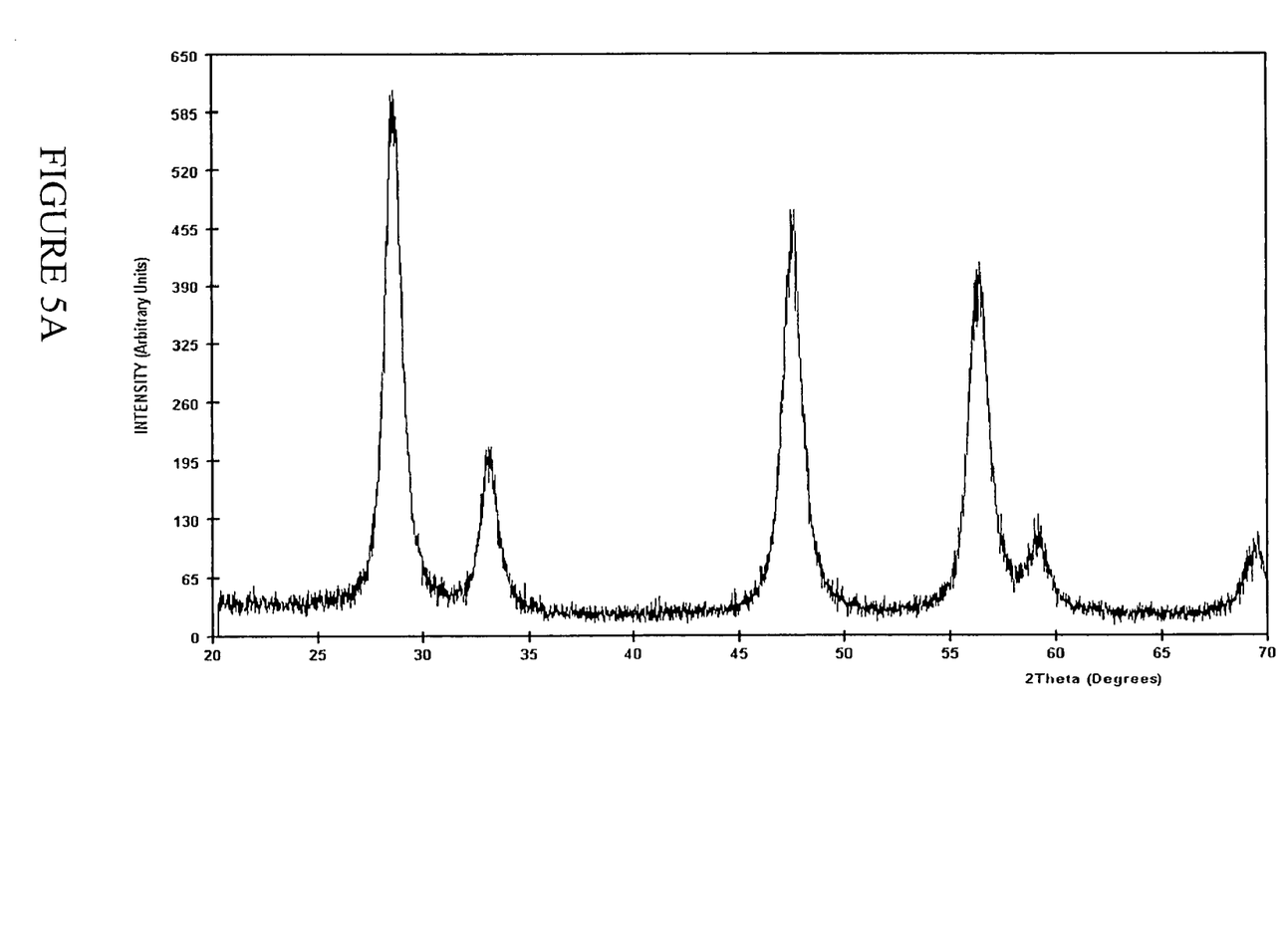
FIG. 5(a) is an XRD pattern of a $Ce_{0.9}Gd_{0.1}O_{1.95}$ powder formed using the invention.
Figure 5B:
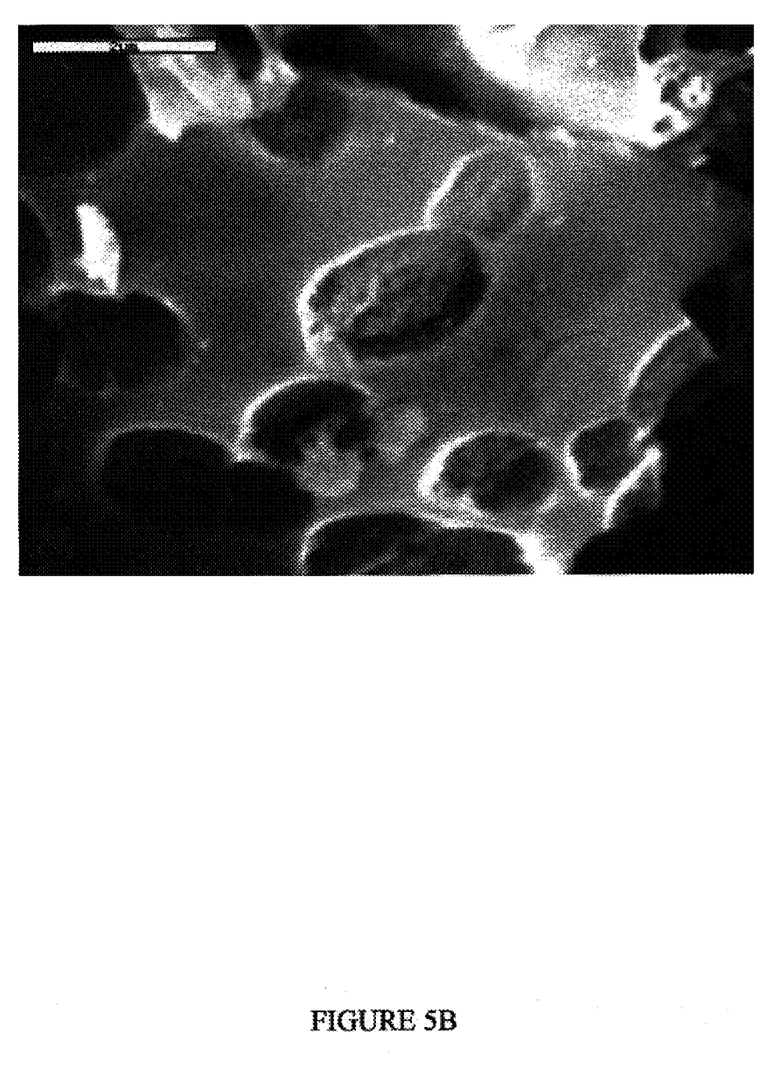
FIG. 5(b) is a SEM image of the powder shown in FIG. 5(a) evidencing the porous nature of the powder. At higher magnification the particle size is shown to be about 50 nm, and surface area data suggest a 26 nm particle size indicating the average particle size to be about 1000 nm.

The mixture was first heated to between 200° C. and 300° C. to form the metal precursor complex. The precursor was then heated in a furnace at 500° C. for 2 hours in air. The XRD pattern from the powder, shown in FIG. 5(a), is similar to that from a stabilized fluorine phase of gadolinium substituted ceria as reported by S. Dikmen, P. Schuk, M. Greenblatt and H. Gocmez, Solid State Sciences, vol 4 (2002) 585–590. A SEM photograph of this powder shown in FIG. 5(b) indicates the porous character of the obtained powder. BET data showed the specific area for this powder to be 29 m$^2$/g, consistent with the powder being very porous. This surface area is equivalent to a particle size of about 26 nm.

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof.

We claim:

1. A method of forming metal oxide powders, comprising the steps of:
    solid state mixing of at least one metal nitrate salt and at least one reducing organic acid having a potential of >−0.957 volts at standard conditions for an electron generating reaction with water to reduce said nitrate and heating to a temperature in a first temperature range to form a metal oxide precursor complex comprising said metal, and
    heating said metal oxide precursor complex to a temperature of at least 200° C. but no more than 1200° C., wherein a metal oxide powder is formed.

2. The method of claim 1, wherein at least a portion of said heating said metal oxide precursor complex is performed in an oxygen containing atmosphere.

3. The method of claim 1, wherein said organic acid is a hydroxy acid.

4. The method of claim 3, wherein said hydroxy acid comprises tartaric acid or citric acid.

5. The method of claim 1, wherein an average particle size of said metal oxide powder is from 10 to 100 nm.

6. The method of claim 1, wherein said first temperate range is from 200 to 400° C.

7. The method of claim 1, further comprising the step of grinding said metal oxide precursor complex before said heating said metal oxide precursor complex step.

8. The method of claim 1, wherein said metal oxide includes at least one phosphor.

9. The method of claim 1, wherein said metal oxide includes at least one ion conducting metal oxide.

10. A method of forming metal oxide powders, comprising the steps of:
    solid state mixing two different metal nitrate salts and at least one reducing organic acid, and
    heating said metal nitrate salts and said reducing organic acid, wherein a mixed metal oxide powder is formed.

* * * * *